United States Patent
Takahashi

(10) Patent No.: US 10,256,619 B2
(45) Date of Patent: Apr. 9, 2019

(54) CABLE WATER STOP STRUCTURE AND WIRE HARNESS

(71) Applicant: Hitachi Metals, Ltd., Tokyo (JP)

(72) Inventor: Noriyuki Takahashi, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 15/967,888

(22) Filed: May 1, 2018

(65) Prior Publication Data

US 2018/0331528 A1 Nov. 15, 2018

(30) Foreign Application Priority Data

May 10, 2017 (JP) ................. 2017-094248

(51) Int. Cl.
| | |
|---|---|
| *H02G 15/113* | (2006.01) |
| *H02G 15/18* | (2006.01) |
| *H02G 15/00* | (2006.01) |
| *B60R 16/02* | (2006.01) |
| *B60R 16/03* | (2006.01) |
| *H01B 7/00* | (2006.01) |
| *B60R 16/023* | (2006.01) |

(52) U.S. Cl.
CPC ....... *H02G 15/113* (2013.01); *B60R 16/0215* (2013.01); *H02G 15/003* (2013.01); *H02G 15/1806* (2013.01); *B60R 16/023* (2013.01); *B60R 16/03* (2013.01); *B60Y 2410/115* (2013.01); *H01B 7/0045* (2013.01)

(58) Field of Classification Search
CPC .. H02G 15/113; H02G 15/1806; H02G 3/088; H02G 3/0691; B60R 16/0215; B60R 16/0207
See application file for complete search history.

(56) References Cited

U.S. PATENT DOCUMENTS

| | | | | |
|---|---|---|---|---|
| 4,778,948 A | * | 10/1988 | Fitch ................. | H01R 4/72 156/49 |
| 2015/0034354 A1 | * | 2/2015 | Yoshida ............. | B60R 16/0215 174/68.3 |
| 2015/0083462 A1 | * | 3/2015 | Yoshida ............. | F16B 2/06 174/136 |
| 2015/0144394 A1 | * | 5/2015 | Webb ................. | H02G 1/14 174/658 |
| 2017/0313265 A1 | | 11/2017 | Shimizu et al. | |

FOREIGN PATENT DOCUMENTS

| | | |
|---|---|---|
| JP | 2011-253681 A | 12/2011 |
| JP | 2015-073414 A | 4/2015 |
| JP | 2015073414 A * | 4/2015 |
| JP | 2016-091731 A | 5/2016 |

\* cited by examiner

*Primary Examiner* — Hoa C Nguyen
*Assistant Examiner* — Amol H Patel
(74) *Attorney, Agent, or Firm* — Scully, Scott, Murphy & Presser, PC

(57) ABSTRACT

A cable water stop structure for a cable that includes plural insulated wires and a sheath covering the plural insulated wires includes a heat shrinkable tube that is shrunk to wrap around an end of the sheath and the plurality of insulated wires extending from the end, and a cover that is attached to sandwich the end of the sheath, the plurality of insulated wires extending from the end and the heat shrinkable tube. The cover includes a gripping portion gripping the heat shrinkable tube to restrict the heat shrinkable tube from moving along a cable longitudinal direction.

7 Claims, 8 Drawing Sheets

CABLE WATER STOP STRUCTURE AND WIRE HARNESS

The present application is based on Japanese patent application No. 2017-094248 filed on May 10, 2017, the entire contents of which are incorporated herein by reference.

BACKGROUND OF THE INVENTION

1. Field of the Invention

The invention relates to a cable water stop structure and a wire harness using the cable water stop structure.

2. Description of the Related Art

In recent years, electrically operated brake systems are used in a vehicle such as an automobile. The known electrically operated brake systems include an electro-mechanical brake (EMB) system and an electric parking brake (EPB) system.

The electro-mechanical brake system, which is also simply called electric friction brake or electric brake, is configured such that a rotational drive force of a dedicated electric motor mounted on each wheel of a vehicle is controlled according to the operation amount (tread force or displacement amount) of a brake pedal by a driver, so that a piston driven by the electric motor presses brake pads against a disc rotor of the wheel to generate a braking force intended by the driver.

The electric parking brake system is configured such that a dedicated electric motor provided on each wheel of a vehicle is driven based on an operation performed on a parking brake activation switch by a driver after stopping a vehicle, so that a piston driven by the electric motor presses brake pads against a disc rotor of the wheel to generate a braking force.

Also, in recent years, sensors, e.g., wheel speed sensor (also called ABS (Anti-Lock Brake System) sensor) for detecting the speed of a wheel rotation during motion, air pressure sensor for detecting air pressure of a tire and temperature sensor, etc., are often mounted on wheels of vehicles.

Consequently, the wheel side and the vehicle body side are connected through composite cables in which a signal line for a sensor mounted on a wheel and/or a signal line for controlling an electro-mechanical brake system and a power line for supplying power to an electric motor of electro-mechanical brake system or electric parking brake system are housed in one sheath.

Where the wire harness is applied for a composite cable, the connection destinations of plural insulated wires (the above-mentioned signal and power lines) provided in the cable are different and the insulated wires thus need to be branched off for each connection destination. At the branching portion, the insulated wires are exposed from the sheath and there is thus a risk that water trickles down along the insulated wires and enters inside the sheath. Therefore, a water stop property (i.e., waterproofness) to stop water from entering inside the sheath needs to be ensured at the portion where the insulated wires are exposed from the sheath.

As a solution, a cable water stop structure may be devised which is configured to prevent water ingress into the inside of the sheath at the portion where the insulated wires are exposed from the sheath, for example, all of the sheath and the exposed insulated wires from the sheath being covered with a molded resin (see, e.g., JP 2016/91731 A). In this structure, however, if the molded resin is, e.g., urethan resin and the insulation of the insulated wire is formed of polyethylene, the molded resin does not adhere to the insulation and it is not possible to ensure the water stop property. To address this problem, a heat shrinkable tube may be further used for covering the molded resin and the cable or the insulated wires extending from the molded resin. In this case, however, the heat shrinkable tube needs to be used for each portion from which the insulated wire or the cable extends and, therefore, the manufacture is very complicated.

Thus, collectively covering a sheath and insulated wires extending from an end of the sheath with a single heat shrinkable tube is proposed so as to ensure the water stop property at the branching portion (see, e.g., JP 2015/73414 A).

JP 2011/253681 A also discloses another prior art that may be related to the present invention.

SUMMARY OF THE INVENTION

Even if the sheath and the insulated wires extending from the end of the sheath are collectively covered with a single heat shrinkable tube, the water stop property may not be ensured under a high-temperature environment of, e.g., 120° C. or more, since the resin tube may be shrunk again and detached from the sheath at the high temperature.

It is an object of the invention to provide a cable water stop structure that prevents water ingress into the inside of the sheath more securely at a portion where insulated wires are exposed from a sheath, as well as a wire harness using the cable water stop structure.

According to an embodiment of the invention, a cable water stop structure for a cable that comprises a plurality of insulated wires and a sheath covering the plurality of insulated wires comprises:

a heat shrinkable tube that is shrunk to wrap around an end of the sheath and the plurality of insulated wires extending from the end; and a cover that is attached to sandwich the end of the sheath, the plurality of insulated wires extending from the end and the heat shrinkable tube, wherein the cover comprises a gripping portion gripping the heat shrinkable tube to restrict the heat shrinkable tube from moving along a cable longitudinal direction.

According to another embodiment of the invention, a wire harness comprises:

a cable comprising a plurality of insulated wires and a sheath covering the plurality of insulated wires;

a heat shrinkable tube that is shrunk to wrap around an end of the sheath and the plurality of insulated wires extending from the end; and a cover that is attached to sandwich the end of the sheath, the plurality of insulated wires extending from the end and the heat shrinkable tube, wherein the cover comprises a gripping portion gripping the heat shrinkable tube to restrict the heat shrinkable tube from moving along a cable longitudinal direction.

Effects of the Invention

According to an embodiment of the invention, a cable water stop structure can be provided that prevents water ingress into the inside of the sheath more securely at a portion where insulated wires are exposed from a sheath, as well as a wire harness using the cable water stop structure.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiment

An embodiment of the invention will be described below in conjunction with the appended drawings.

Description of a Vehicle in which a Wire Harness is Used

Figure 1:
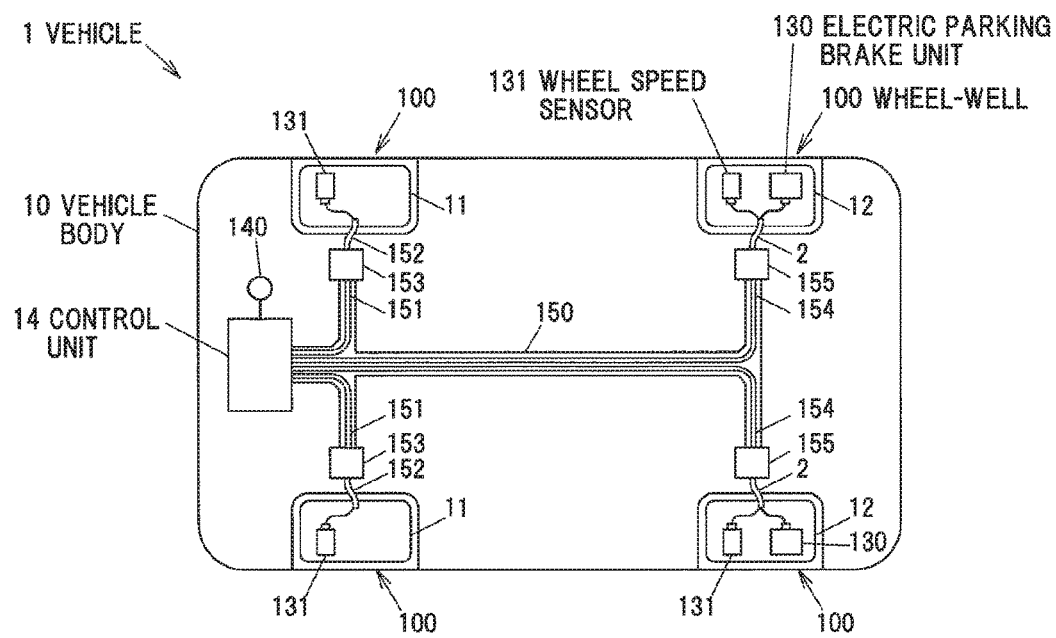
FIG. 1 is a schematic diagram illustrating a configuration of a vehicle in which a wire harness in an embodiment of the present invention is used.

FIG. 1 is a schematic diagram illustrating a configuration of a vehicle in which a wire harness in the present embodiment is used.

A vehicle 1 has four wheel-wells 100 on a vehicle body 10, and two front wheels 11 and two rear wheels 12 are respectively arranged in the wheel-wells 100. In the present embodiment, the vehicle 1 is a front-wheel-drive vehicle and the front wheels 11 are driven by a drive force from a drive source (not shown) such as an engine or electric motor. In other words, in the present embodiment, the front wheels 11 are drive wheels and the rear wheels 12 are non-driven wheels.

The vehicle 1 also has two electric parking brake units 130 and a control unit 14. The electric parking brake units 130 are provided so as to respectively correspond to the two rear wheels 12, are activated by a current supplied from the control unit 14 and generate a braking force applied to the rear wheels 12. The control unit 14 can detect an operating state of a parking brake activation switch 140 provided inside a passenger compartment of a vehicle and a driver can activate or deactivate the electric parking brake units 130 by an on/off operation of the parking brake activation switch 140.

When a driver turns the parking brake activation switch 140 from, e.g., an off state to an on state during when the vehicle is not in motion, an operating current for operating the electric parking brake units 130 is output from the control unit 14 for a predetermined period of time (e.g., for 1 second). The electric parking brake units 130 are thereby activated and generate a braking force applied to the rear wheels 12. The activated state of the electric parking brake units 130 is maintained until a current to deactivate the electric parking brake units 130 is output from the control unit 14. In this manner, the electric parking brake units 130 generate a braking force mainly after the vehicle 1 stops.

The control unit 14 outputs a current to deactivate the electric parking brake units 130 when the parking brake activation switch 140 is switched from the on state to the off state by an operation of the driver. The control unit 14 also outputs a current to deactivate the electric parking brake units 130 when, e.g., an accelerator pedal is depressed, in addition to when the parking brake activation switch 140 is turned off.

Meanwhile, each of the front wheels 11 and the rear wheels 12 is provided with a wheel speed sensor (ABS sensors) 131 for detecting a wheel speed. The wheel speed sensor 131 itself is a well-known wheel speed sensor which has a magnetic field sensing element for detecting a magnetic field of an annular magnetic encoder rotating together with the front wheel 11 or the rear wheel 12 and detects a wheel speed (a rotation speed of the front wheel 11 or the rear wheel 12) based on the cycle of change in the direction of the magnetic field.

The control unit 14 is electrically connected to the wheel speed sensors 131 of the front wheels 11 through front wheel wire groups 151 each composed of plural electric wires and front wheel wire harnesses 152. In each junction box 153 which is fixed to the vehicle body 10, the front wheel wire group 151 is connected to the front wheel wire harness 152. The junction boxes 153 are respectively arranged in the vicinities of the pair of right and left front wheels 11.

The control unit 14 is also electrically connected to the electric parking brake units 130 and the wheel speed sensors 131 of the rear wheels 12 through rear wheel wire groups 154 each composed of plural electric wires and wire harnesses 2 in the present embodiment. In each junction box 155 which is fixed to the vehicle body 10, the rear wheel wire group 154 is connected to the wire harness 2. The junction boxes 155 are respectively arranged in the vicinities of the pair of right and left rear wheels 12.

The front wheel wire groups 151 are arranged in a bundled state on a wiring path 150 provided on the vehicle body 10. The rear wheel wire groups 154 are also arranged in a bundled state on the wiring path 150 provided on the vehicle body 10, in the same manner as the front wheel wire groups 151.

One end of the front wheel wire harness 152 is connected to the wheel speed sensor 131 of the front wheel 11, and the other end is housed in the junction box 153. One end of the rear wheel wire harness 2 is connected to the electric parking brake unit 130 and the wheel speed sensor 131 of the rear wheel 12, and the other end is housed in the junction box 155. The front wheel wire harnesses 152 and the rear wheel wire harnesses 2 are bent in accordance with vertical movement of the front wheels 11 and the rear wheels 12 relative to the vehicle body 10 during motion of the vehicle 1, and are thus required to have a high flexibility.

Description of Cable Used for the Wire Harness 2

Figure 2:
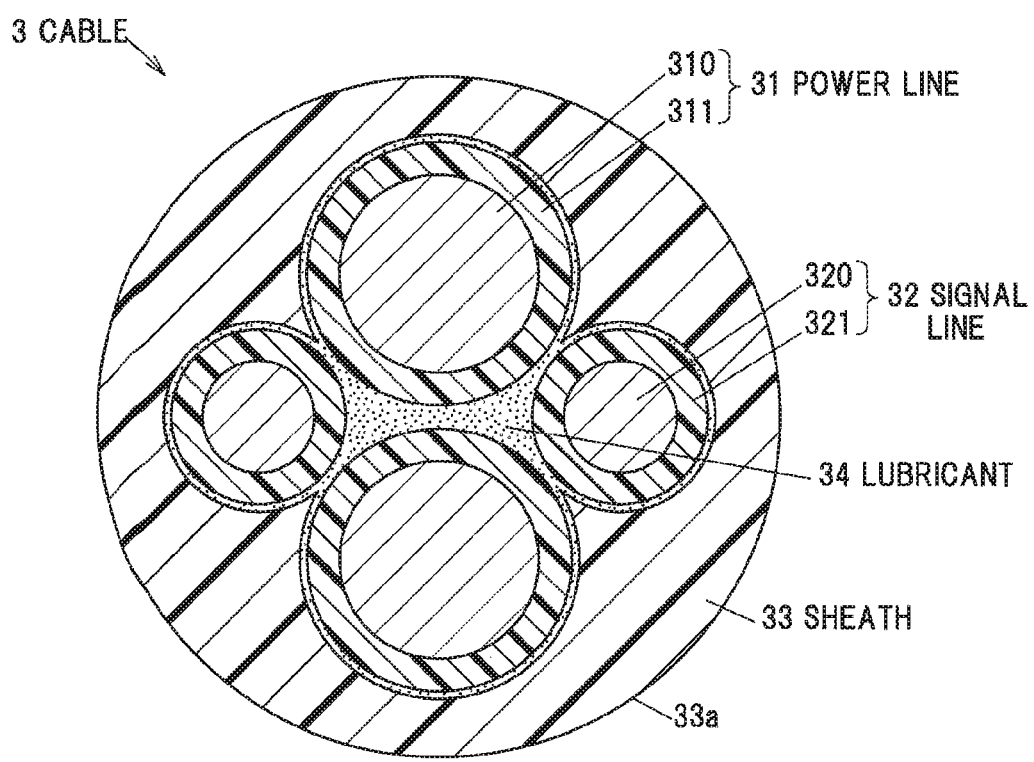
FIG. 2 is a cross sectional view showing a cable used for the wire harness.

FIG. 2 is a cross sectional view showing a cable 3 constituting the wire harness 2. The cable 3 has a pair of power lines 31, a pair of signal lines 32, and a sheath 33 by which the pair of power lines 31 and the pair of signal lines 32 are covered together. In the present embodiment, the pair of power lines 31 and the pair of signal lines 32 are held by the sheath 33 via a lubricant 34. The power lines 31 and the signal lines 32 are one aspect of the insulated wire of the invention.

A first power connector (not shown) used for connection to the electric parking brake 130 is attached to one end of the pair of power lines 31, and a second power connector (not shown) used for connection to the rear wheel wire group 154 in the junction box 155 is attached to the other end of the pair of power lines 31.

The wheel speed sensor 131 is attached to one end of the pair of signal lines 32, and a signal line connecting connector (not shown) used for connection to the rear wheel wire group 154 in the junction box 155 is attached to the other end.

The wire harness 2 in the present embodiment is provided with the cable 3, the first power connector, the second power connector, the wheel speed sensor 131 and the signal line connecting connector. In the wire harness 2, the pair of power lines 31 and the pair of signal lines 32 exposed from the sheath 33 are branched off, and a cable water stop structure 4 in the present embodiment is used at a branching portion 3a to prevent ingress of water inside the sheath 33. The details will be described later.

The pair of power lines 31 are used to supply a current to the electric parking brake unit 130. The pair of signal lines 32 are used to transmit a detection signal from the wheel speed sensor 131 to the control unit 14. That is, vehicle state quantity detection signals indicating the running state of the vehicle 1 are transmitted to the control unit 14 through the pair of signal lines 32 when the vehicle 1 is in motion.

Each of the pair of power lines 31 is an insulated wire formed by covering a central conductor 310 comprising a highly conductive wire of copper, etc., with an insulation 311 formed of an insulating resin. The central conductor 310 is a twisted wire formed of plural strands. The insulation 311 is formed of, e.g., a crosslinked PE (polyethylene) or a crosslinked flame-retardant PE (polyethylene).

The pair of signal line 32 is an insulated wire formed by covering a central conductor 320 comprising a highly conductive wire of copper, etc., with an insulation 321 formed of an insulating resin. The central conductor 320 is a twisted wire formed of plural strands. The insulation 321 is formed of, e.g., a crosslinked PE (polyethylene) or a crosslinked flame-retardant PE (polyethylene). The signal line 32 has a smaller outer diameter than the power line 31.

The power lines 31 and the signal lines 32 are not covered with a shield conductor. In other words, any conductive members for shielding electromagnetic wave are not arranged between the power lines 31 and the signal lines 32. This is because it is not necessary to provide a shield conductor between the signal lines 32 and the power lines 31 since current flows through the power lines 31 mainly during when the vehicle 1 is not in motion and electrical signals are transmitted through the signal lines 32 mainly during when the vehicle 1 is in motion. That is, when a current flows through the pair of power lines 31, electromagnetic wave generated by the current can affect a potential difference between the pair of signal lines 32. However, since the control unit 14 can be set to ignore the electrical signals transmitted through the signal lines 32 during when the vehicle 1 is not in motion, i.e., when a vehicle speed is zero, an adverse effect on travel of the vehicle 1 can be avoided. In addition, not covering the signal lines 32 with a shield conductor increases flexibility and resulting bendability of the cable 3 and also contributes to weight reduction and cost reduction of the cable 3.

The power lines 31 and the signal lines 32 are alternately arranged in a circumferential direction of the cable 3, and the pair of power lines 31 and the pair of signal lines 32 are twisted together.

The sheath 33 is formed of an insulating resin. In the present embodiment, the sheath 33 is formed of polyurethane which is excellent in flexibility and durability.

The lubricant 34 formed of talc ($Mg_3Si_4O_{10}(OH)_2$) or silica ($SiO_2$), etc., and having a particle size of, e.g., 5 to 50 µm can be suitably used. The particle size here means a particle diameter obtained by a method defined by JIS 8801 such as sieve analysis, microscopy, a laser diffraction scattering method, an electrical sensing method or a chromatography method. Alternatively, a paper tape or lubricant oil may be used as the lubricant 34. Use of lubricant 34 allows the pair of power lines 31 and the signal lines 32 to move smoothly inside the sheath 33, and this increases bendability and also facilitates termination of the cable 3.

Description of Cable Water Stop Structure

Figure 3:
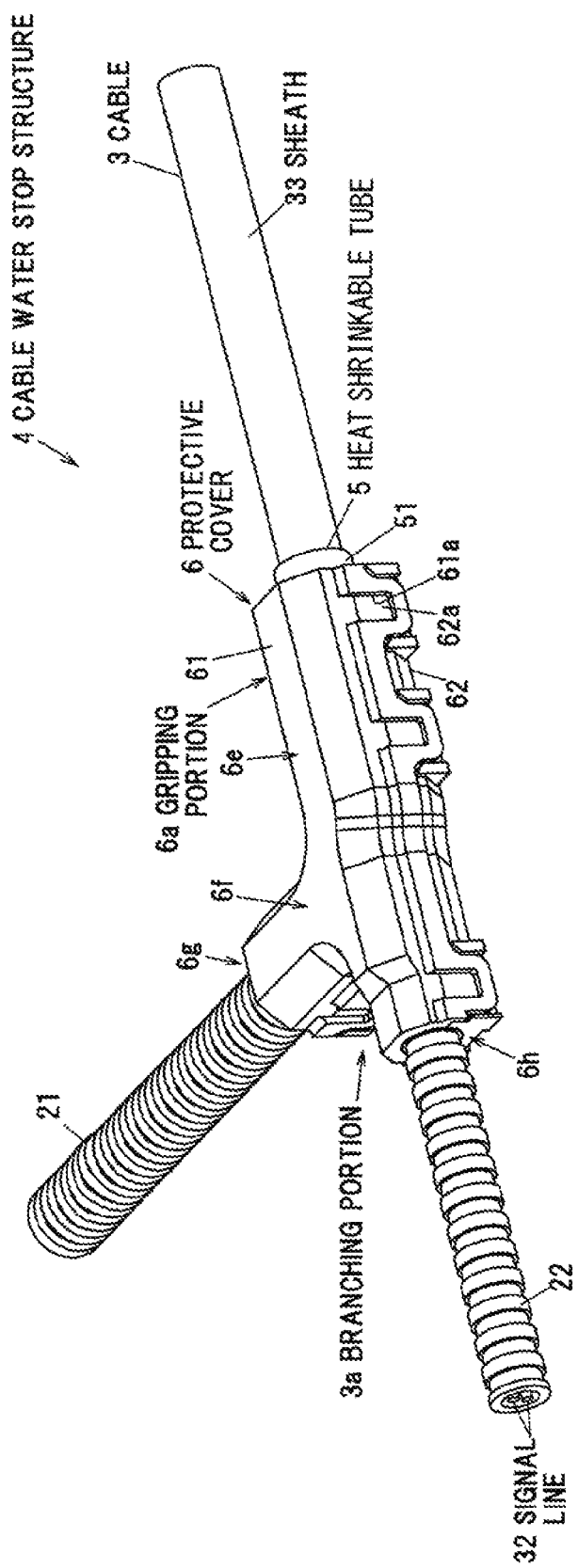
FIG. 3 is a perspective view showing a cable water stop structure in the embodiment of the invention.
Figure 4:
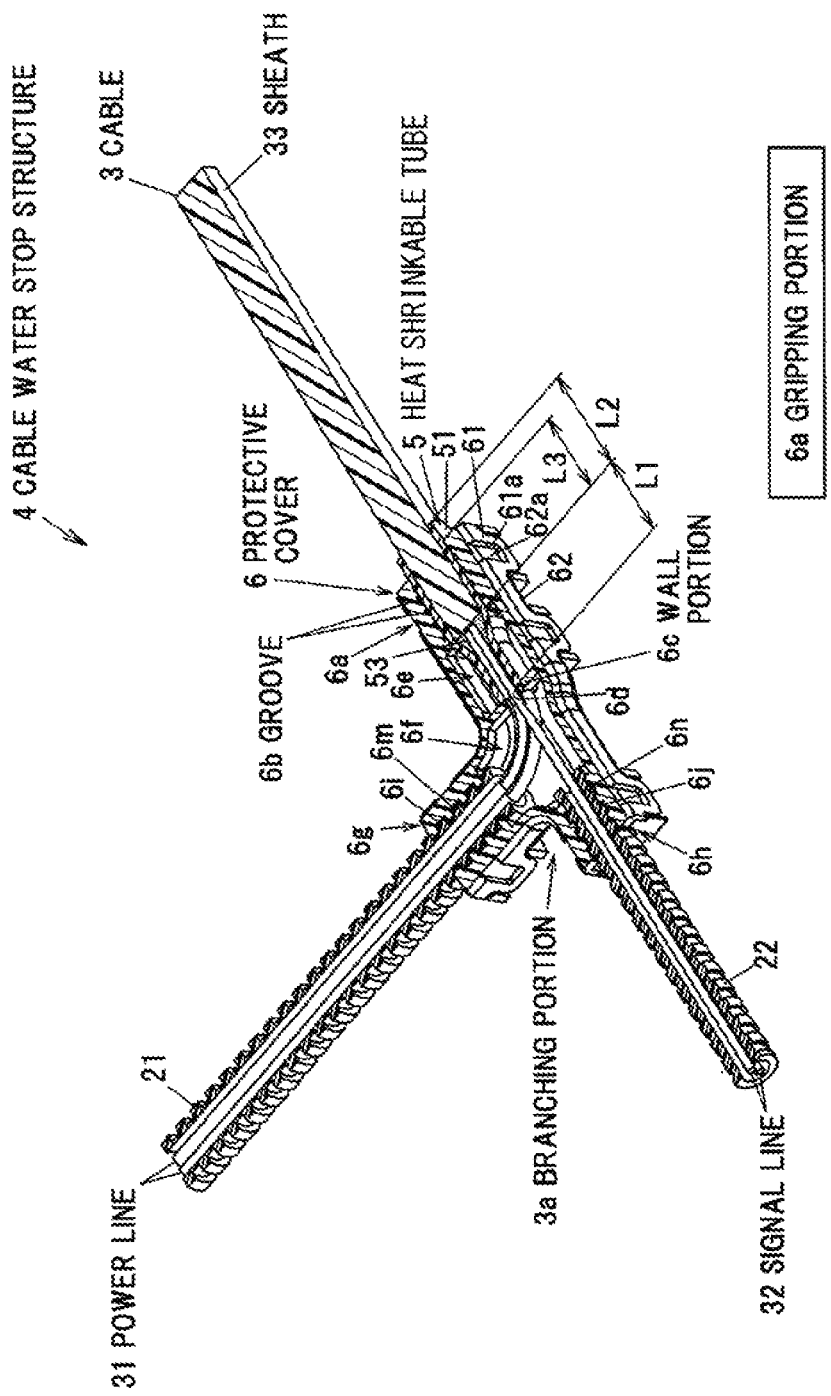
FIG. 4 is a cross sectional view of FIG. 3.

FIG. 3 is a perspective view showing a cable water stop structure in the present embodiment, and FIG. 4 is a cross sectional view thereof.

As shown in FIGS. 3 and 4, the cable water stop structure 4 in the present embodiment is a structure for stopping water from entering inside the sheath 33 at the portion where the power lines 31 and the signal lines 32 are exposed from the sheath 33 of the cable 3. At the branching portion 3a of the cable 3, the sheath 33 is partially removed and the power lines 31 and the signal lines 32 are exposed. Although the pair of power lines 31 are branched off from the pair of signal lines 32 at the branching portion 3a in this example, the configuration at the branching portion 3a only needs to be such that at least some of plural insulated wires extending from the sheath 33 extend in a different direction. In the present embodiment, the pair of signal lines 32 extend in a direction parallel to the longitudinal direction of the cable 3 having the sheath 33, and the pair of power lines 31 extend in a direction orthogonal to the extending direction of the pair of signal lines 32. In other words, the pair of signal lines 32 and a portion of the cable 3 having the sheath 33 are arranged on a straight line, and the pair of power lines 31 are branched off and extend in a direction orthogonal to the straight line.

The cable water stop structure 4 is to prevent water from entering inside the sheath 33 of the cable 3, and is provided on an end of the sheath 33 and spanning over the power lines 31 and the signal lines 32 extending from the sheath 33.

Description of the Heat Shrinkable Tube 5

The cable water stop structure 4 is provided with a heat shrinkable tube 5 which covers an end of the sheath 33 as well as the plural insulated wire (the pair of power lines 31 and the pair of signal lines 32) extending out therefrom.

The heat shrinkable tube 5 has a heat-shrinkable resin tube 51 and an adhesive layer (not shown) formed of an adhesive provided on the inner surface of the resin tube 51. The resin tube 51 formed of polyolefin is used in the present embodiment. The adhesive constituting the adhesive layer is a hot melt adhesive such as epoxy resin.

The adhesive constituting the adhesive layer of the heat shrinkable tube 5 is melted by heat applied to shrink the resin tube 51, enters a gap between the resin tube 51, the power lines 31, the signal lines 32 and the sheath 33, and cures and seals the gap between the resin tube 51, the power lines 31, the signal lines 32 and the sheath 33 after shrinking.

In the present embodiment in which the four-core cable 3 having the pair of power lines 31 and the pair of signal lines 32 is used, each gap between the insulated wires is larger than that in, e.g., a two-core cable. Therefore, in the present embodiment, another adhesive is separately provided in addition to the adhesive layer of the heat shrinkable tube 5 so that the gaps between insulated wires (the pair of power lines 31 and the pair of signal lines 32) can be reliably sealed.

In detail, the heat shrinkable tube 5 is provided after annular (short cylindrical) adhesives 52 (see FIGS. 7A and 7B) are pre-arranged around the both power lines 31 and the both signal lines 32, and then, heat is applied to shrink the resin tube 51 and also to melt the annular adhesives 52 to fill the gaps between the insulated wires. The annular adhesive 52 preferably has the same components as the adhesive layer of the heat shrinkable tube 5 and can be a hot melt adhesive such as epoxy resin. A portion denoted by the reference numeral 53 in FIG. 4 is an adhesive portion formed by melting and subsequent curing of the adhesive layer of the heat shrinkable tube 5 and the annular adhesives 52.

A portion of the heat shrinkable tube 5 overlapping the sheath 33 has a length L2 which is preferably not less than 5 mm, desirably not less than 10 mm. This is because when the length L2 is as short as less than 5 mm, there is a higher risk that the heat shrinkable tube 5 comes off from the sheath 33 in a high-temperature environment. The length L2 is 20 mm in this example. A portion of the heat shrinkable tube 5 not overlapping the sheath 33 (i.e., a portion of the heat shrinkable tube 5 covering the power lines 31 and the signal lines 32 extending from the sheath 33) has a length L1 allowing sufficient water stop property to be ensured by sealing with the adhesive (the adhesive layer of the heat shrinkable tube 5 and the adhesives 52), and the length L1 is preferably not less than 5 mm, desirably not less than 10 mm. The length L1 is 10 mm in this example.

Description of the Protective Cover 6

Figure 5:
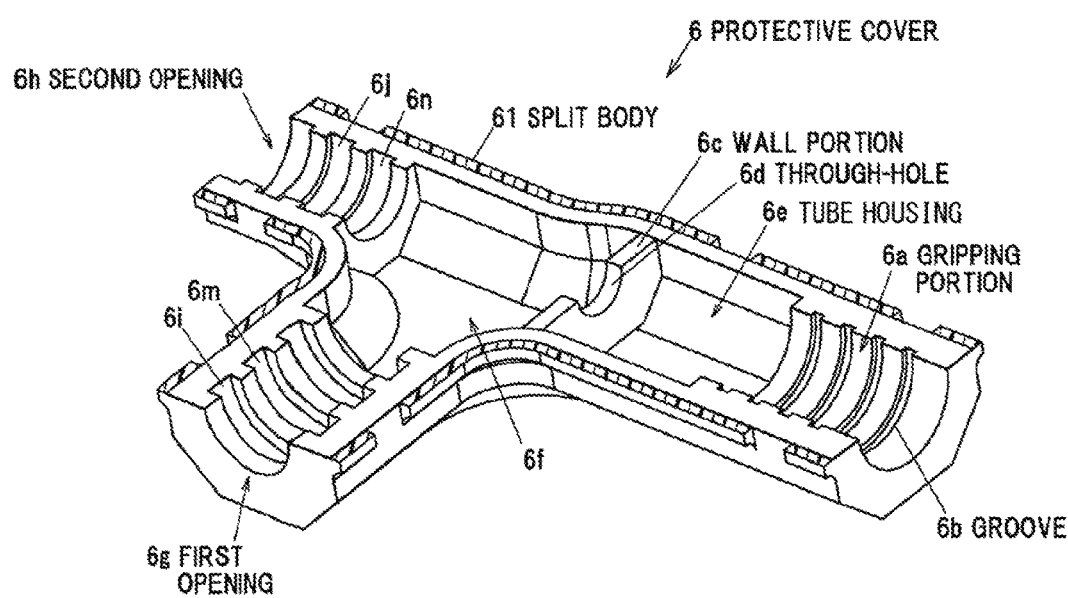
FIG. 5 is a cross sectional view showing a protective cover.

FIG. 5 is a cross sectional view showing a protective cover 6. As shown in FIGS. 3 to 5, the cable water stop structure 4 is further provided with the protective cover 6 which is a cover of the invention and is attached to sandwich an end of the sheath 33, the plural insulated wires (the pair of power lines 31 and the pair of signal line 32) extending out therefrom and the heat shrinkable tube 5. The protective cover 6 in the present embodiment is a branching portion-protecting cover which is attached to the branching portion 3a and protects the branching portion 3a.

The protective cover 6 is composed of two split bodies 61 and 62, and is configured such that engagement protrusions 62a provided on the split body 62 are engaged with engagement holes 61a provided on the split body 61 and the two split bodies 61 and 62 are thereby fixed to each other. The means for fixing the two split bodies 61 and 62 to each other is not limited to the configuration shown in the drawing. However, the means for fixing the two split bodies 61 and 62 to each other is desirably capable of easily fixing the two split bodies 61 and 62 to each other by one-touch operation and also capable of firmly fixing the two split bodies 61 and 62 with strength enough to grip the heat shrinkable tube 5. In addition, although the two split bodies 61 and 62 are separate members in the present embodiment, the two split bodies 61 and 62 may be integrally coupled by hinges.

The protective cover 6 has a gripping portion 6a which grips the heat shrinkable tube 5 to restrict the heat shrinkable tube 5 from moving along a cable longitudinal direction. In the cable water stop structure 4 of the present embodiment, the heat shrinkable tube 5 is gripped by the gripping portion 6a of the protective cover 6 and displacement of the heat shrinkable tube 5 in a high-temperature environment is thereby prevented.

Since the gripping portion 6a needs to firmly grip the heat shrinkable tube 5 in a high-temperature environment, the protective cover 6 is desirably formed of a resin having a softening temperature higher than a shrinkage temperature of the heat shrinkable tube 5. More preferably, the softening temperature of the protective cover 6 is not less than 150° C.

In detail, the protective cover 6 formed of PBT (polybutylene terephthalate) or nylon can be suitably used. The shrinkage temperature of the heat shrinkable tube 5 here is a temperature at which the resin tube 51 starts to shrink and the inner diameter thereof is reduced by not less than 1% of the inner diameter before shrinking. Meanwhile, the softening temperature is Vicat softening temperature specified in JIS K 7206 and is a temperature at which the resin starts to deform.

The gripping portion 6a grips a portion of the heat shrinkable tube 5 covering the sheath 33. The reason is as follows: if the gripping portion 6a grips a portion of the heat shrinkable tube 5 covering the insulated wires (the pair of power lines 31 and the pair of signal lines 32), the resin tube 51, which cannot expand radially outward in a high-temperature environment due to contact with the gripping portion 6a and thus expands radially inward, may squeeze the adhesive (the adhesive layer of the heat shrinkable tube 5 and the adhesives 52) out of the resin tube 51, resulting in that water stop property cannot be ensured.

The gripping portion 6a has plural grooves 6b formed on the inner surface thereof along a direction perpendicular to the cable longitudinal direction. When the heat shrinkable tube 5 is gripped by the gripping portion 6a, the grooves 6b receives a portion of the wall of the resin tube 51 dodging the pressure of protrusions between the grooves 6b, and thereby strongly restricts axial movement of the resin tube 51. Although four grooves 6b are spaced apart in the longitudinal direction in this example, the number of the grooves 6b is not limited thereto. In addition, the grooves 6b do not needs to be exactly perpendicular to the cable longitudinal direction, and may be slightly off (specifically, within 10° with respect to the cable longitudinal direction).

Grip strength of the gripping portion 6a is not specifically limited, but is preferably adjusted so that movement of the heat shrinkable tube 5 in a high-temperature environment of, e.g., not less than 120° C. can be restricted. In more detail, the inner diameter of the gripping portion 6a (the inner diameter of the protrusions between the grooves 6b) is desirably not less than 1 mm smaller than the outer diameter of the non-gripped sheath 33, so that the outer diameter of the sheath 33 is reduced by not less than 1 mm by pressure of the protrusions between the grooves 6b when gripped by the gripping portion 6a.

A length L3 of the gripping portion 6a along the cable longitudinal direction is preferably not less than 5 mm and not more than 15 mm. This is because when the length L3 is less than 5 mm, a sufficient gripping force may not be obtained and it may not be possible to prevent displacement of the heat shrinkable tube 5 in a high-temperature environment. Meanwhile, when the length L3 is more than 15 mm, the size of the protective cover 6 is increased and this may cause a problem such as a decrease in the degrees of freedom of routing layout of the wire harness 2. In the present embodiment, the length L3 is about 10 mm. In addition, in the present embodiment, the heat shrinkable tube 5 extends toward the extension side of the cable 3 beyond the gripping portion 6a.

The protective cover 6 also has a wall portion 6c which is in contact with an end of the heat shrinkable tube 5 on the extension side of the plural insulated wires (the pair of power lines 31 and the pair of signal lines 32) and thereby restricts the heat shrinkable tube 5 from moving toward the extension side of the plural insulated wires. A through-hole 6d allowing passage for the pair of power lines 31 and the pair of signal lines 32 is formed on the wall portion 6c. In addition, a hollow-cylindrical tube housing 6e for housing a portion of the heat shrinkable tube 5 covering the insulated wires is provided between the wall portion 6c and the gripping portion 6a. The wall portion 6c is arranged to close an opening of the tube housing 6e on the opposite side to the gripping portion 6a.

In the present embodiment, the wall portion 6c serves to restrict movement of the heat shrinkable tube 5 and also serves to prevent the adhesive (the adhesive layer of the heat shrinkable tube 5 and the adhesives 52) inside the resin tube 51 from flowing away in a high-temperature environment. The through-hole 6d is desirably as small as possible so that the adhesive does not flow away through the through-hole 6d. In addition, the wall portion 6c is desirably in abutting contact with an end face of the resin tube 51 so that the adhesive does not flow away through a gap between the wall portion 6c and the resin tube 51. However, it is not limited thereto and a slight gap may be present between the wall portion 6c and the end face of the resin tube 51.

In the configuration in which the pair of power lines 31 and the pair of signal lines 32 are gripped by the through-hole 6d with a reduced size, vibration caused by swinging of the power lines 31 and the signal lines 32 is prevented from being transferred to the heat shrinkable tube 5.

A branching-portion housing 6f for housing the branching portion 3a of the power lines 31 and the signal lines 32 is provided on a side of the wall portion 6c opposite to the tube housing 6e. The branching-portion housing 6f has a first opening 6g allowing the pair of power lines 31 to extend out and a second opening 6h allowing the pair of signal lines 32 to extend out. Although the extending direction of the pair of power lines 31 extending from the first opening 6g is orthogonal to the extending direction of the pair of signal lines 32 extending from the second opening 6h in this example, the extending directions of the insulated wires are not limited thereto.

A first corrugated-tube holding portion 6i for holding a first corrugated tube 21 covering the pair of power lines 31 extending from the protective cover 6 is circumferentially formed at an edge of the first opening 6g. Likewise, a second corrugated-tube holding portion 6j for holding a second corrugated tube 22 covering the pair of signal lines 32 extending from the protective cover 6 is circumferentially formed at an edge of the second opening 6h.

The corrugated tubes 21 and 22 are bellows-shaped resin tubes and are provided to prevent the power lines 31 and the signal lines 32 from being damaged by chipping. The corrugated tubes 21 and 22 are provided to respectively entirely cover the pair of power lines 31 from the protective cover 6 to the first power connector and the pair of signal lines 32 from the protective cover 6 to the wheel speed sensor 131. The corrugated-tube holding portions 6i and 6j respectively have grooves 6m and 6n on the inner surfaces thereof. The split bodies 61 and 62 are integrated in a state that raised portions (large-diameter portions) of the corrugated tubes 21 and 22 are fitted to the grooves 6m and 6n so that the protective cover 6 sandwiches end portions of the corrugated tubes 21 and 22, and the corrugated tubes 21 and 22 are thereby held. In the present embodiment, an axial direction of the first corrugated-tube holding portion 6i is orthogonal to an axial direction of the gripping portion 6a, and an axial direction of the second corrugated-tube holding portion 6j coincides with the axial direction of the gripping portion 6a.

Although the protective cover 6 described in the present embodiment is a branching portion-protecting cover which covers the branching portion 3a, it is not limited thereto. The protective cover 6 may be a connector cover (connector housing) which holds connection terminals provided at ends of the plural insulated wires. In this case, a connection terminal holding portion for holding the connections terminals is provided in place of the branching-portion housing 6f shown in the drawing.

Procedure to Assemble the Wire Harness 2

Figure 6:
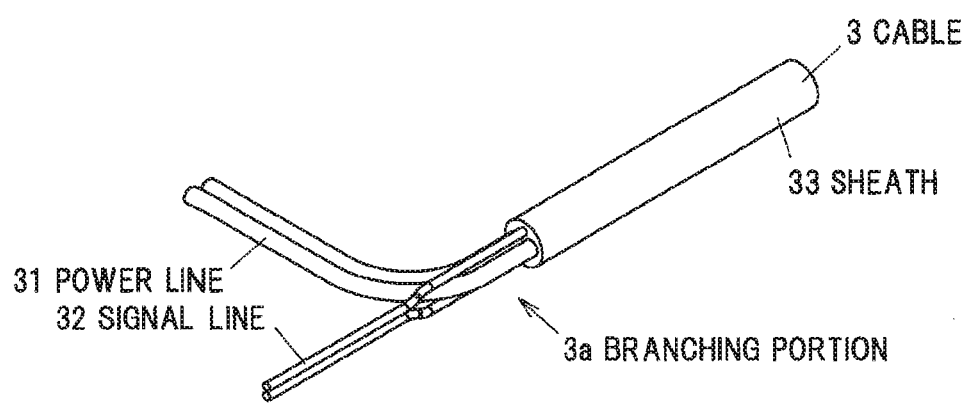
FIG. 6 is a perspective view showing the cable after termination.

When assembling the wire harness 2, firstly, the pair of power lines 31 and the pair of signal lines 32 are exposed at an end of the cable 3 by cutting off a predetermined length of the sheath 33, as shown in FIG. 6. Although FIG. 6 shows the pair of power lines 31 and the branched pair of signal lines 32 so as to correspond to FIG. 3 or 4, it is not necessary to branch off at this stage.

Figure 7A:
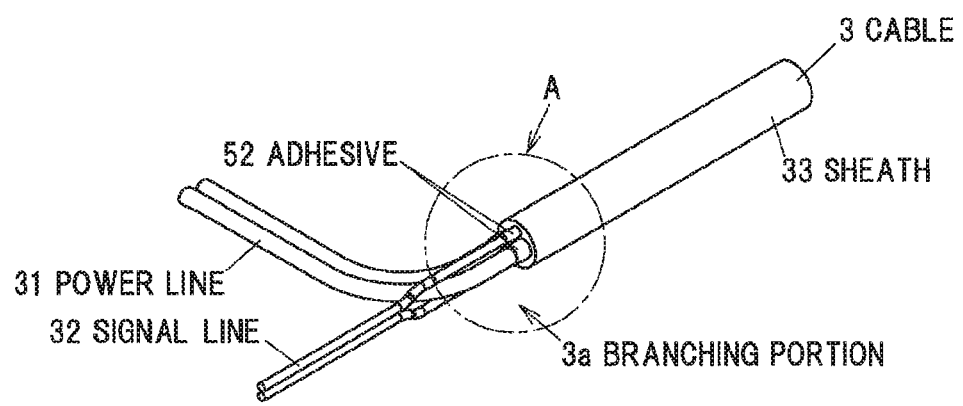
FIG. 7A is a perspective view when adhesives are arranged on the cable of FIG. 6.
Figure 7B:
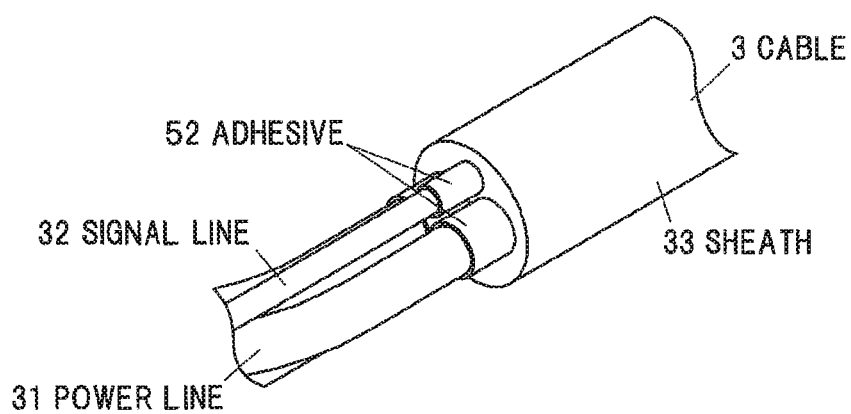
FIG. 7B is an enlarged view of a portion A.

After that, the annular adhesives 52 are separately arranged around the power lines 31 and the signal lines 32, as shown in FIGS. 7A and 7B. The adhesives 52 are melted when shrinking the heat shrinkable tube 5, enter the gap between the power lines 31, the signal lines 32 and the resin tube 51, and fill and seal the gap. When the number of the cores of the cable 3 is three or more as is in the present embodiment in which the four-core cable 3 is used, it is desirable to separately provide the adhesives 52 since the gaps between the cores are larger and it may not be possible to fill the gaps only with the adhesive layer of the heat shrinkable tube 5. That is, use of the adhesives 52 allows the thickness of the adhesive layer of the heat shrinkable tube 5 to be reduced even when the gaps between the cores of the cable 3 are large, and such thin adhesive layer allows the heat shrinkable tube 5 to be thinner and prevents misalignment of the heat shrinkable tube 5 due to melting of the adhesive layer in a high-temperature environment.

The annular adhesives 52 are inserted from the ends of the power lines 31 and the signal lines 32 and are arranged in contact with the sheath 33. Although the adhesive 52 is individually arranged around each insulated wire (each power line 31 and each signal line 32) in then present embodiment, it may be configured such that plural (e.g., two) insulated wires are covered with one adhesive 52. In addition, the shape of the adhesive 52 is not limited to the annular shape. For example, columnar adhesives 52 may be arranged between the insulated wires.

Figure 8A:
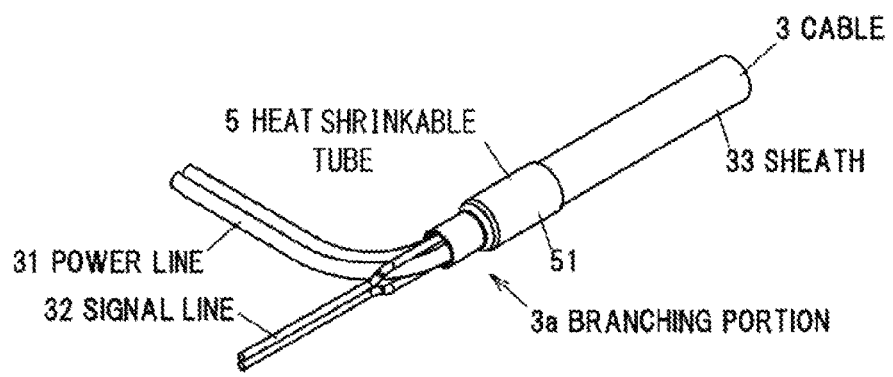
FIG. 8A is a perspective view after providing a heat shrinkable tube.

After that, the heat shrinkable tube 5 is provided so that an end of the sheath 33 and the pair of power lines 31 and the pair of signal lines 32 extending out therefrom are covered as shown in FIG. 8A, and the heat shrinkable tube 5 is then shrunk by heating. In the present embodiment, the adhesives 52 separately provided are arranged inside the heat shrinkable tube 5. Therefore, if heat is applied for a long time so that the adhesives 52 are sufficiently melted, the resin tube 51 of the heat shrinkable tube 5 may be excessively shrunk, which reduces the length L2 of the heat shrinkable tube 5 overlapping the sheath 33.

Figure 8B:
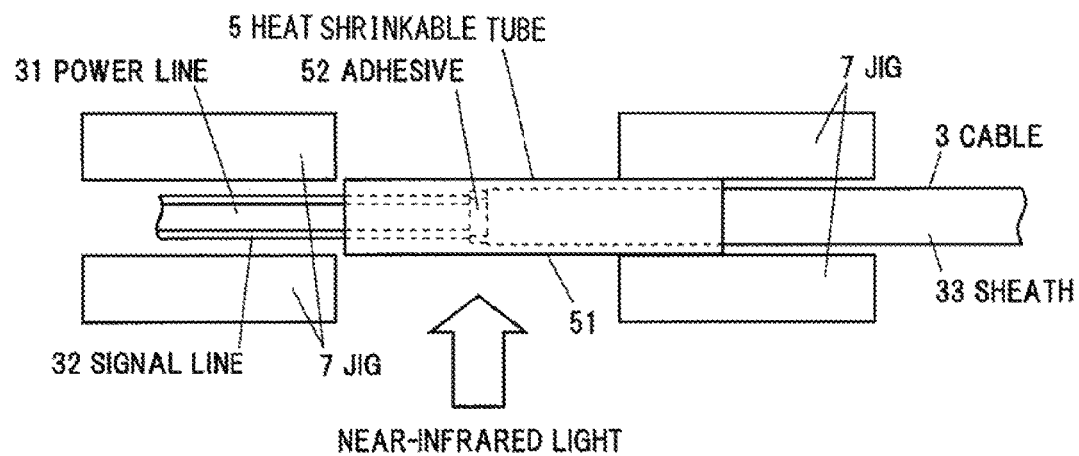
FIG. 8B is an explanatory diagram illustrating a process of shrinking the heat shrinkable tube.

To address this problem, heat is applied by irradiating near-infrared light in a state that the cable 3 and a portion of the heat shrinkable tube 5 overlapping the sheath 33 are gripped by a jig 7, as shown in FIG. 8B. In this case, even when heat is applied long enough to sufficiently melt the adhesives 52, misalignment of the heat shrinkable tube 5 (movement of the heat shrinkable tube 5 toward the extension side of the power lines 31 and the signal lines 32) can be prevented, resulting in that the length L2 described above can be sufficient and water stop property can be ensured.

Once irradiation of near-infrared light is stopped to terminate heating, the adhesive portion 53 is formed due to curing of the adhesives 52 and the adhesive layer of the heat shrinkable tube 5, and the gap between the resin tube 51, the power lines 31, the signal lines 32 and the sheath 33 is sealed.

The portion of the heat shrinkable tube 5 (the resin tube 51) gripped by the jig 7 (an end portion of the heat shrinkable tube 5 on a side overlapping the sheath 33) is not directly exposed to near-infrared light and is hardly shrunk since the near-infrared light is blocked by the jig 7. Therefore, after the adhesives 52 and the adhesive layer of the heat shrinkable tube 5 are cured and the resin tube 51 is positioned, near-infrared light is irradiated again onto the unshrunk portion of the resin tube 51 so that the entire resin tube 51 is shrunk.

After that, an end of the sheath 33, the plural insulated wires extending out therefrom and the heat shrinkable tube 5 are sandwiched by the two split bodies 61 and 62, and then, the two split bodies 61 and 62 are fixed to each other. At this time, the pair of power lines 31 are inserted into the first corrugated tube 21, and the first corrugated tube 21 is arranged so that an end thereof is held by the first corrugated-tube holding portion 6i. Meanwhile, the pair of signal lines 32 are inserted into the second corrugated tube 22, and the second corrugated tube 22 is arranged so that an end thereof is held by the second corrugated-tube holding portion 6j.

Once the two split bodies 61 and 62 are fixed to each other, the protective cover 6 is formed and the heat shrinkable tube 5 is gripped by the gripping portion 6a of the protective cover 6 and is restricted from moving in the cable longitudinal direction. The wire harness 2 is thereby obtained.

Functions and Effects of the Embodiment

As described above, the cable water stop structure 4 in the present embodiment is provided with the heat shrinkable tube 5 shrunk to wrap around an end of the sheath 33 and the plural insulated wires (the power lines 31 and the signal lines 32) extending out therefrom, and the protective cover 6 which is attached to sandwich the end of the sheath 33, the plural insulated wires (the power lines 31 and the signal lines 32) extending out therefrom and the heat shrinkable tube 5 and has the gripping portion 6a gripping the heat shrinkable tube 5 to restrict the heat shrinkable tube 5 from moving along the cable longitudinal direction.

In a high-temperature environment, the heat shrinkable tube 5 generally starts to shrink and is likely to be misaligned. When the heat shrinkable tube 5 has an adhesive layer as is in the present embodiment, the adhesive layer is melted in a high-temperature environment and the heat shrinkable tube 5 is more likely to be misaligned. However, since the heat shrinkable tube 5 is gripped by the gripping portion 6a of the protective cover 6 in the present embodiment, it is possible to prevent misalignment of the heat shrinkable tube 5 in a high-temperature environment and water ingress into the inside of the sheath 33 thus can be prevented more reliably. In addition, in the present embodiment, it is not necessary to provide the heat shrinkable tube on every portion from which the cable 3 or the insulated wire extends out, and water ingress into the inside of the sheath 33 can be prevented by using only one heat shrinkable tube 5 (and the protective cover 6). Thus, the structure is simple and the number of components is reduced, thereby contributing to reduce the cost of the wire harness 2.

The branching portion 3a could be covered with, e.g., a molded resin. In this case, however, it takes time to cool down after forming the molded resin and the manufacturing cost thus increases. By using the separately molded protective cover 6 as is in the present embodiment, it is possible to eliminate such cooling time and thus to reduce the manufacturing cost.

Water stop property could be ensured by using a rubber packing such as O-ring. In this case, however, it is necessary to provide rubber packings around the sheath 33 as well as around each of the insulated wires (power lines 31 and the signal lines 32) extending from the sheath 33, and this increases the numbers of components and manufacturing processes. In addition to this, since these rubber packings need to have a small inner diameter to tightly squeeze the sheath 33 and the insulated wires, it takes much time and effort to attach the rubber packings. In contrast, in the present embodiment, the increase in the numbers of components and manufacturing processes can be suppressed since only one heat shrinkable tube 5 is used, and it is easy to attach the heat shrinkable tube 5 since it is only necessary to insert the heat shrinkable tube 5 having a relatively large inner diameter and then shrink the heat shrinkable tube 5 by heating.

Summary of the Embodiment

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A cable water stop structure (4) for a cable that comprises a plurality of insulated wires (31, 32) and a sheath (33) covering the plurality of insulated wires (31, 32), the cable water stop structure (4) comprising: a heat shrinkable tube (5) that is shrunk to wrap around an end of the sheath (33) and the plurality of insulated wires (31, 32) extending from the end; and a cover (6) that is attached to sandwich the end of the sheath (33), the plurality of insulated wires (31, 32) extending from the end and the heat shrinkable tube (5), wherein the cover comprises a gripping portion (6a) gripping the heat shrinkable tube (5) to restrict the heat shrinkable tube (5) from moving along a cable longitudinal direction.

[2] The cable water stop structure (4) defined by HU, wherein the cover (6) further comprises a wall portion (6c) that is in contact with an end of the heat shrinkable tube (5) on the extension side of the plurality of insulated wires (31, 32) and thereby restricts the heat shrinkable tube (5) from moving toward the extension side of the plurality of insulated wires (31, 32).

[3] The cable water stop structure (4) defined by HU or [2], wherein the gripping portion (6a) grips a portion of the heat shrinkable tube (5) covering the sheath (33).

[4] The cable water stop structure (4) defined by any of [1] to [3], wherein the gripping portion (6a) comprises a plurality of grooves (6b) formed on the inner surface thereof along a direction perpendicular to the cable longitudinal direction.

[5] The cable water stop structure (4) defined by any of [1] to [4], wherein the cover (6) further comprises a resin having a softening temperature that is higher than a shrinkage temperature of the heat shrinkable tube (5).

[6] The cable water stop structure (4) defined by any of [1] to [5], wherein the cover (6) further comprises a branching portion-protecting cover attached to a branching portion (3a) from which at least a part of the plurality of insulated wires (31, 32) extends in a different direction.

[7] The cable water stop structure (4) defined by any of [1] to [5], wherein the cover (6) further comprises a connector cover that holds connection terminals provided at ends of the plurality of insulated wires (31, 32).

[8] A wire harness (2), comprising: a cable (3) comprising a plurality of insulated wires (31, 32) and a sheath (33) covering the plurality of insulated wires (31, 32); a heat shrinkable tube (5) that is shrunk to wrap around an end of the sheath (33) and the plurality of insulated wires (31, 32) extending from the end; and a cover (6) that is attached to sandwich the end of the sheath (33), the plurality of insulated wires (31, 32) extending from the end and the heat shrinkable tube (5), wherein the cover comprises a gripping portion (6a) gripping the heat shrinkable tube (5) to restrict the heat shrinkable tube (5) from moving along a cable longitudinal direction.

Although the embodiment of the invention has been described, the invention according to claims is not to be limited to the embodiment described above. Further, please note that all combinations of the features described in the embodiment are not necessary to solve the problem of the invention.

The invention can be appropriately modified and implemented without departing from the gist thereof. For example, although the four-core cable 3 having the pair of power lines 31 and the pair of signal lines 32 is used in the embodiment, the number of insulated wires is not limited thereto and may be two, three or five or more. In addition, all insulated wires of the cable 3 may be only the power lines 31 or only the signal lines 32.

Furthermore, the intended use of the signal line 32 is not limited to signal transmission from the wheel speed sensor 131. For example, the signal line 32 may be used for, e.g., an air pressure sensor for detecting air pressure of the wheel 11 or 12, or the cable 3 may be provided with plural signal lines 32 used for different purposes. In addition, the intended use of the power line 31 is not limited to power supply to the electric parking brake unit 130, and the power line 31 may be used to supply power to, e.g., an electro-mechanical brake system.

What is claimed is:

1. A cable water stop structure for a cable that comprises a plurality of insulated wires and a sheath covering the plurality of insulated wires, the cable water stop structure comprising:
    a heat shrinkable tube that is shrunk to wrap around an end of the sheath and the plurality of insulated wires extending from the end; and
    a cover that is attached to sandwich the end of the sheath, the plurality of insulated wires extending from the end and the heat shrinkable tube,
    wherein the cover comprises a gripping portion gripping the heat shrinkable tube to restrict the heat shrinkable tube from moving along a cable longitudinal direction; and
    wherein the cover further comprises a branching portion-protecting cover attached to a branching portion from which at least a part of the plurality of insulated wires extends in a different direction.

2. The cable water stop structure according to claim 1, wherein the cover further comprises a wall portion that is in contact with an end of the heat shrinkable tube on the extension side of the plurality of insulated wires and thereby restricts the heat shrinkable tube from moving toward the extension side of the plurality of insulated wires.

3. The cable water stop structure according to claim 1, wherein the gripping portion grips a portion of the heat shrinkable tube covering the sheath.

4. The cable water stop structure according to claim 1, wherein the gripping portion comprises a plurality of grooves formed on the inner surface thereof along a direction perpendicular to the cable longitudinal direction.

5. The cable water stop structure according to claim 1, wherein the cover further comprises a resin having a softening temperature that is higher than a shrinkage temperature of the heat shrinkable tube.

6. A cable water stop structure for a cable that comprises a plurality of insulated wires and a sheath covering the plurality of insulated wires, the cable water stop structure comprising:
    a heat shrinkable tube that is shrunk to wrap around an end of the sheath and the plurality of insulated wires extending from the end; and
    a cover that is attached to sandwich the end of the sheath, the plurality of insulated wires extending from the end and the heat shrinkable tube,
    wherein the cover comprises a gripping portion gripping the heat shrinkable tube to restrict the heat shrinkable tube from moving along a cable longitudinal direction, and
    wherein the cover further comprises a connector cover that holds connection terminals provided at ends of the plurality of insulated wires.

7. A wire harness, comprising:
    a cable comprising a plurality of insulated wires and a sheath covering the plurality of insulated wires;
    a heat shrinkable tube that is shrunk to wrap around an end of the sheath and the plurality of insulated wires extending from the end; and
    a cover that is attached to sandwich the end of the sheath, the plurality of insulated wires extending from the end and the heat shrinkable tube,
    wherein the cover comprises a gripping portion gripping the heat shrinkable tube to restrict the heat shrinkable tube from moving along a cable longitudinal direction; and
    wherein the cover further comprises a branching portion-protecting cover attached to a branching portion from which at least a part of the plurality of insulated wires extends in a different direction.

* * * * *